US006281733B1

(12) United States Patent
Miura et al.

(10) Patent No.: US 6,281,733 B1
(45) Date of Patent: *Aug. 28, 2001

(54) CLOCK CONTROL METHOD AND INTEGRATED CIRCUIT ELEMENT MANUFACTURED BY USING SAME

(75) Inventors: Hiroki Miura, Warabi; Yasuhito Koumura, Tokyo; Kenshi Matsumoto, Koshigaya, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,263

(22) Filed: Sep. 8, 1997

(30) Foreign Application Priority Data

Sep. 13, 1996 (JP) .................................................. 8-243885

(51) Int. Cl.⁷ ........................................................ G06F 1/04
(52) U.S. Cl. ............................................. 327/299; 327/155
(58) Field of Search .................................... 327/564, 565, 327/295, 297, 291, 407, 299, 99, 293, 294, 408, 141, 144, 146, 152, 154, 155

(56) References Cited

U.S. PATENT DOCUMENTS

| 4,626,716 | * | 5/1996 | Miki | 327/270 |
|---|---|---|---|---|
| 4,637,018 | * | 1/1987 | Flora et al. | 714/700 |
| 4,761,567 | * | 8/1988 | Walters, Jr. et al. | 307/269 |
| 5,065,042 | * | 11/1991 | Thomsen et al. | 327/160 |
| 5,220,217 | * | 6/1993 | Scarra et al. | 307/481 |
| 5,517,638 | * | 5/1996 | Szczepanek | 395/550 |
| 5,751,175 | * | 5/1998 | Imamura | 327/291 |
| 5,754,069 | * | 5/1998 | Nagarajai | 327/198 |

OTHER PUBLICATIONS

"Hitachi Single–Chip RISC Microcomputer SH7032, SH7034, HD6417032, HD6477034, Hardware Manual" (Third Edition), Copyright 1993.

* cited by examiner

Primary Examiner—Timothy P. Callahan
(74) Attorney, Agent, or Firm—Hogan & Hartson, LLP

(57) ABSTRACT

A clock control method is proposed, in which malfunctions caused by clock skews are decreased when the same high-speed clock is used inside and outside an IC. An original clock is input via CKIN, with the return path of an output buffer connected to an input buffer in an input/output buffer. The clock, once output via the output buffer, returns to the IC as a reentry clock. The selected reentry clock or original clock are used in the IC. The clock appearing at SYSCK is used in an external circuit. By using the reentry clock in the IC, the clock skew corresponding to the delay of the output buffer can be decreased.

6 Claims, 2 Drawing Sheets

CLOCK CONTROL METHOD AND INTEGRATED CIRCUIT ELEMENT MANUFACTURED BY USING SAME

BACKGROUND OF THE INVENTION

1. Field of the Invention

The present invention relates to a clock control method and an integrated circuit element (hereinafter referred to as an IC), and particularly relates to an IC using a clock in the internal circuit thereof and a method of controlling the clock inside the IC.

2. Description of the Prior Art

The integration of circuits carries advantages of reduced packaging area through an increased degree of the integration and reduced cost manufacturing through a decreased number of components. As one example, a microcomputer having a clock generating circuit built therein is given on page 89 of "Hitachi Single-Chip RISC Microcomputer SH7032, SH7034, HD6417032, HD6477034, HD6437034 Hardware Manual (third edition)". FIG. 2 is a circuit diagram regarding a clock of this microcomputer.

As shown in FIG. 2, the circuit has two input terminals XTAL 2 and EXTAL 4, via which a signal is input and then transmitted to an oscillator 6. The input terminals XTAL and EXTAL are also connected to a crystal oscillator and a capacitive circuit in a known manner. A clock is oscillated by the oscillator 6, shaped in a duty correction circuit 8, and then supplied to the internal circuit of the microcomputer and an output terminal CK 10. The output terminal CK in turn supplies the clock to an external system of the microcomputer.

According to the microcomputer, the provision of the built-in oscillator 6 can decrease the number of components constituting the circuit, and the same clock can be used in the internal circuit and the external system. Therefore, timings can easily be controlled, both inside and outside the microcomputer.

As another advantage of the circuit integration, there is a high-speed operation of the circuit. In general, the delay of a gate in the IC is smaller than that of the equivalent external logic circuit constituted by discrete components. By incorporating the main part of the circuit into a single IC, the operation speed of the entire device is improved.

In order to improve operation speed, the employment of a high speed (high frequency) clock is necessary. When the high-speed clock is used, however, a problem of clock skew occurs. Clock skew refers to a deviation in timings of clocks, which should be originally the same, caused by gating or dividing the clocks. When a low-speed clock is used, in order to eliminate the clock skew, a delay gate can be incorporated in a relatively advanced clock, or other countermeasure can be taken. However, for example, in the 50 MHz clock having one cycle of only 20 ns, adjustment by means of the delay gate is limited. On the spot of design, there is a daily situation that even if one place is corrected, a timing violation arises in another place. When high-speed circuit operation is desired, avoiding malfunction caused by clock skew is important, but it is a remarkably intricate and laborious work.

In the aforementioned microcomputer, the clock appearing at the external terminal CK is delayed as much as an output buffer, as compared with the clock used in the internal circuit. When this microcomputer is manufactured so as to operate at, for example, 50 MHz, the delay of the output buffer is usually about several ns, which would produce a critical clock skew inside and outside the microcomputer as the case may be. Additionally, since the advanced clock is used in the microcomputer, the adjustment of timings by means of the external delay gate is usually unfeasible.

SUMMARY OF THE INVENTION

Wherefore, an object of the present invention is to provide a method in which clock skews inside and outside an IC are reduced and the IC using the method.

Another object of this invention is to control a clock with a minimum number of terminals.

A further object of this invention is to flexibly perform a clock control test on a circuit.

To attain these and other objects, the invention provides the following clock control method and IC.

(1) Clock Control Method

In the invention, the clock existing in the IC is output once via the output path of an input/output buffer and returned via the input path of the same input/output buffer into the IC. This clock is used in the internal circuit of the IC.

Therefore, both the clocks used inside and outside the IC pass an output buffer in the input/output buffer. The clock returned into the IC passes an input buffer in the input/output buffer. The delay of the input buffer is usually smaller than that of the output buffer. If the other conditions are the same, clock skews are decreased in the circuit as compared with the circuit of FIG. 2. In the circuit of FIG. 2, the greater the load on the external circuit is, the more skews are produced. In the invention, however, skews are independent of the external load. Further in the invention, the clock inside the IC is delayed as much as the input buffer, and the delay can be advantageously adjusted easily outside the IC.

Another advantage of this method lies in that the same input/output buffer is used for the output and reentry of the clock. A single input/output buffer means only one terminal. Therefore, the terminal can be effectively used.

(2) Clock Control IC

The invention provides an IC using a clock in the internal circuit thereof. The IC includes a clock generator, an input/output buffer for supplying the generated clock to an output path, and a selector for selecting either a signal in the input path of the input/output buffer or the clock. The selected signal is supplied to the internal circuit as an internal clock.

In operation of the structure, a clock is first generated in the clock generator. This clock is supplied to the output path of the input/output buffer, i.e. the input side of an output buffer. On the other hand, the input path of the input/output buffer, i.e. the output side of an input buffer is connected to the input of the selector. Therefore, in the selector, either the first generated clock or the output and returned clock (hereinafter referred to as the reentry clock) is selected and output. If the reentry clock is selected, clock skews are decreased inside and outside the IC, because the selected clock is given to the internal circuit of the IC.

Another advantage of this structure lies in that, not only the reentry clock, but also the first generated clock, can be selected. Specifically, when the problem is the wave form of the clock to be used inside the IC, rather than the clock skew inside and outside the IC, the first generated clock is preferable to the reentry clock because the reentry clock is deformed by the external circuit component.

As mentioned above, the clock is generated inside the IC in the invention. Alternatively, a clock is input via an input terminal, and the clock resulting from the input clock can be supplied to the output path of the input/output buffer. The clock resulting from the input clock includes the input clock itself and the input clock divided or otherwise processed inside the IC.

DETAILED DESCRIPTION OF THE PREFERRED EMBODIMENT

The preferred embodiment of the invention is described below with reference to the drawings.

[1] Circuit Structure

Figure 1:
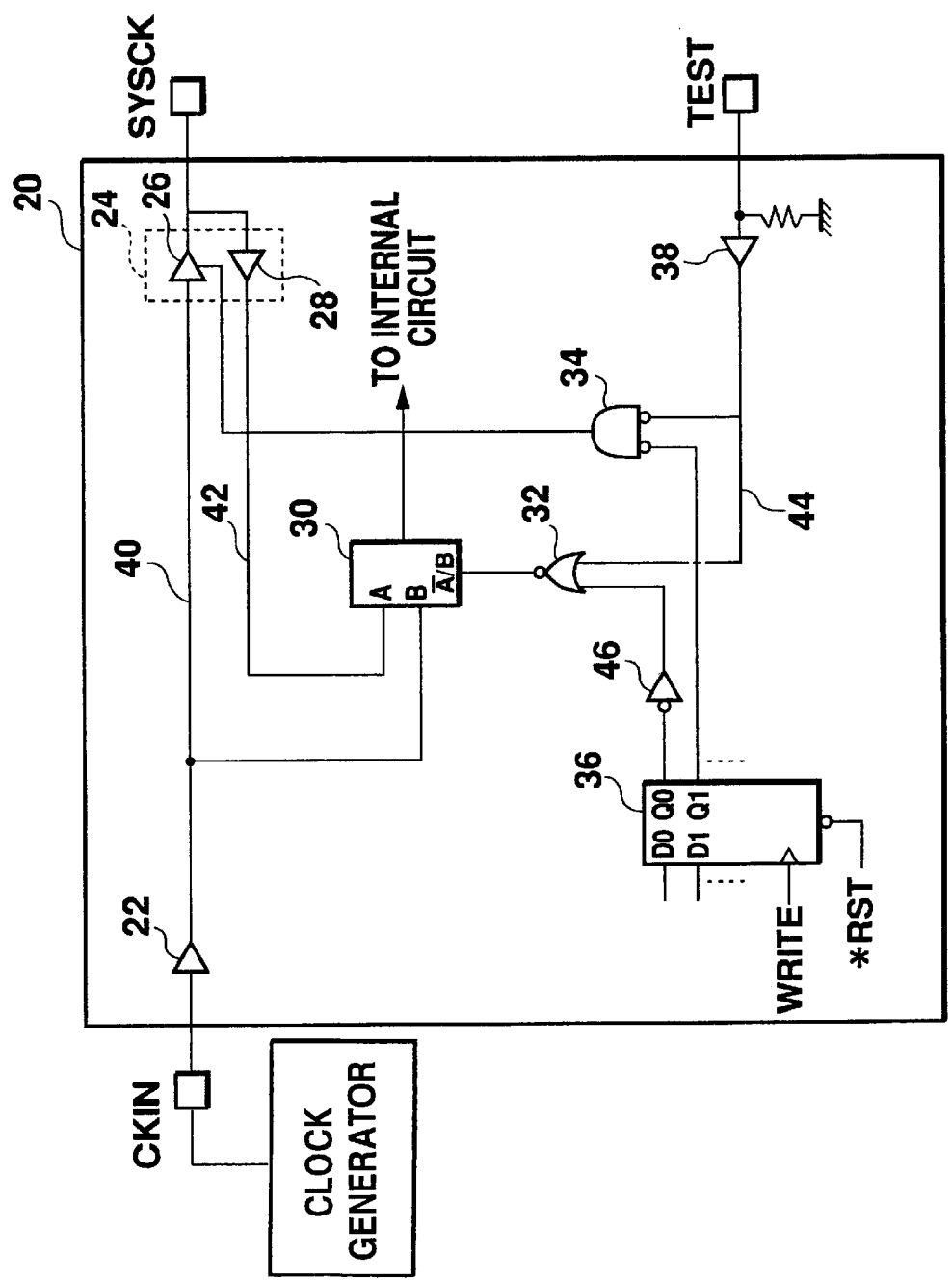
FIG. 1 is a schematic diagram showing the IC internal structure related to a clock control embodying the present invention.

FIG. 1 is a schematic diagram of the portion related to clock control inside the IC according to an embodiment of this invention. As shown in FIG. 1, this IC 20 has input terminals CKIN and TEST and an input/output terminal SYSCK. The original clock to be used in the internal circuit of the IC 20 is input via the terminal CKIN. When the terminal TEST has a high input, a test mode is designated. The system clock to be used outside the IC 20 is output via the terminal SYSCK. As detailed later, however, a clock can be input from the outside via the terminal SYSCK into the IC 20.

The signals applied to the terminals CKIN and TEST are transmitted into the IC 20 via a known input buffer 22 and an input buffer 38 provided with a pull-down resistor, respectively. The terminal TEST may be usually open, and is given a high signal when a test is performed. The clock passing the input buffer 22 of the terminal CKIN is referred to as an original clock 40, and the signal passing the input buffer 38 of the terminal TEST as a test 44.

The terminal SYSCK is connected to an input/output buffer 24. The input/output buffer 24 is composed of an output buffer 26 forming an output path and an input buffer 28 forming an input path. The original clock 40 is input via the output buffer 26. The input side of the input buffer 28 is connected to the output side of the output buffer 26 in the IC 20. Therefore, the clock once output from the output buffer 26 is input via the input buffer 28, and a reentry clock 42 appears at the output side of the input buffer 28.

A selector 30, of a 2-input and 1-output type, is given the reentry clock 42 at an input A and the original clock 40 at an input B. A selector terminal is connected to the output of an NOR gate 32, described later. When the input of the NOR gate 32 is low, the reentry clock 42 is selected and output. When the input is high, the original clock 40 is selected and output. The output of the selector 30 is supplied to the internal circuit of the IC 20.

A register 36 is in charge of clock control. Data inputs D0 and D1 of the register 36 are assigned to the control of the selector 30 and the control of the output buffer 26, respectively. When a writing command WRITE is applied to the register 36, the control data appear at outputs Q0 and Q1, respectively. A signal *RST is input via the reset input of the register 36 for resetting the entire IC 20, and the outputs Q0 and Q1 are initialized to zero. The output Q0 is inverted at an inverter 46.

The NOR gate 32 connected to the selector 30 is of a 2-input type: one input is connected to the output of the inverter 46; and the other input is connected to the output of the input buffer 38 of the terminal TEST. The output of the NOR gate 32 is connected to the selector terminal of the selector 30.

An NOR gate 34 related to the control of the output buffer 26 is also of a 2-input type: one input is connected to the output Q1 of the register 36; and the other input is connected to the output of the input buffer 38. The output of the NOR gate 34 is connected to an enabling terminal of the output buffer 26. In the output buffer 26, when the enabling signal is high, output is enabled, and when the enabling signal is low, output is disabled.

[2] Circuit Operation (1) After Initialization

The terminal TEST is now open. After initialization, both the outputs Q0 and Q1 of the register 36 are low, and the test 44 is also low. Therefore, the NOR gate 32 has a low output and the NOR gate 34 has a high output. First, the high output of the NOR gate 34 is transmitted to the output buffer 26, which is thus enabled to operate. The clock is then output via the terminal SYSCK. In this manner, the external system of the IC 20 is put into operation.

On the other hand, the low output of the NOR gate 32 is transmitted to the selector 30, in which the input A, i.e. the reentry clock 42 is selected. Since the reentry clock 42 passes the output buffer 24 in the same manner as the clock supplied outside the IC 20, clock skews are decreased as compared with the prior art.

(2) Changeover of a Clock for the Internal Circuit

In order to supply the original clock 40, instead of the reentry clock 42, to the internal circuit, number "1" is written in the data input D0 of the register 36. The data input D1 is unchanged. The writing in D0 makes low the output of the inverter 46. The test 44 is also low. Therefore, the NOR gate 32 has a high output, and the input B is selected in the selector 30. The input B is the original clock 40, and the objective is thus reached.

(3) Stoppage of the External Clock

Some devices have a standby mode or other energy-saving mode. In this mode, part of the circuit operation is usually stopped, thereby obviating the necessity of a clock. For example, when no element other than the IC 20 requires a clock, number "1" is written in the data inputs D0 and D1 of the register 36. The writing in D0 first supplies the original clock 40, instead of the reentry clock 42, to the internal circuit. The writing in D1 reduces the output of the NOR gate 34, and the output buffer 26 is disabled. Therefore, the inside of the IC 20 can be operated using the original clock 40, while no clock appears at the terminal SYSCK. In case of the CMOS device, a large part of cell consumption power is proportional to the frequency, and the output buffer originally consumes more power than the internal cell. Therefore, as long as the external system requires no clock, energy can effectively be saved by disabling the output buffer.

(4) Test Mode

The IC 20 is now initialized as aforementioned in (1). When a high signal is applied to the terminal TEST, the NOR gate 32 connected to the selector 30 has a low output, and the reentry clock 42 is to be supplied to the internal circuit. On the other hand, the NOR gate 34 connected to the output buffer 26 has a low output, and the output buffer 26 is disabled to operate. Therefore, the output state of the terminal SYSCK is off.

By realizing this off condition, the IC 20 can be tested on board. Specifically, when a random clock is applied to the terminal SYSCK from the outside, an optional test, for example, a frequency margin test can be performed on the IC 20. This function can be naturally used for the unit test as well as the on-board test of the IC 20.

[3] Modification

The following modifications of the embodiment are possible.

Figure 2:
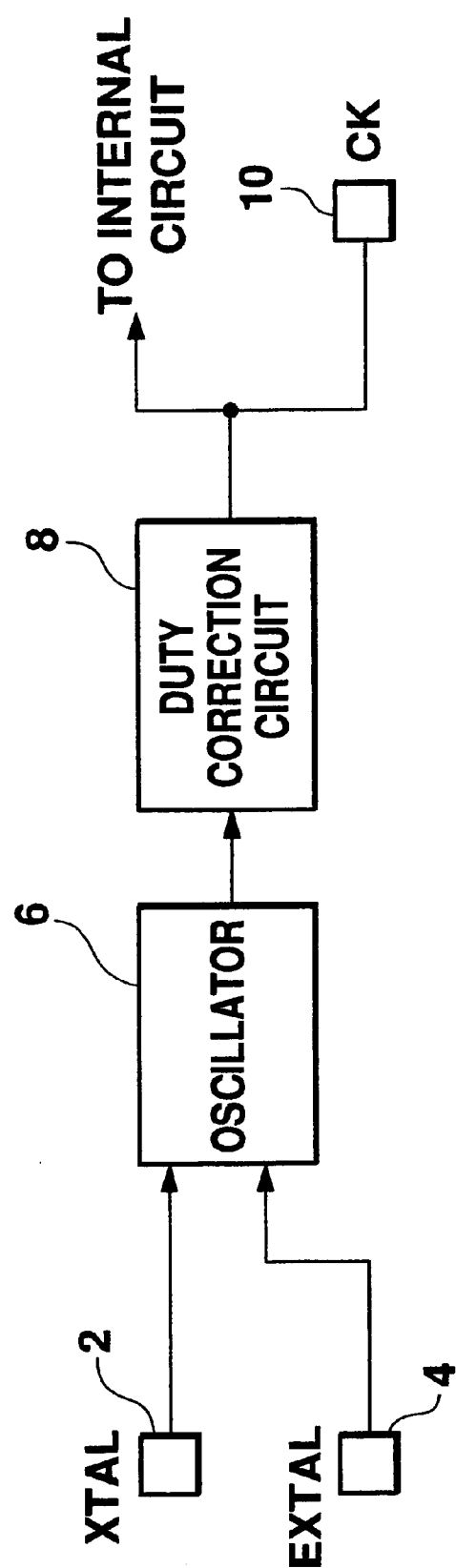
FIG. 2 is a schematic diagram showing the clock related circuit in the microcomputer described in page 89 of "the Hardware Manual (Version 3) of Hitachi Single-Chip RISC Microcomputer SH7032, SH7034, HD6417032, HD6477034, HD6437034".

(1) In the embodiment the original clock is input via the input terminal CKIN. However, for example, when an oscillator is built in the IC 20, the terminal CKIN can be replaced by the terminals XTAL and EXTAL shown in FIG. 2, and the external clock generating circuit can be deleted.

(2) For example, when a CR circuit is provided inside the IC 20 for generating a self-contained clock, the terminals CKIN, XTAL, EXTAL, or the like can be deleted.

What is claimed is:

1. A clock control method for an integrated circuit, which comprises the steps of:

receiving an original clock existing in the integrated circuit and outputting an output original clock via an output path of an input/output buffer to outside of said integrated circuit;

returning the output original clock via an input path of the input/output buffer; and selectively using the returned clock or the original clock in an internal circuit of the integrated circuit.

2. An integrated circuit using a driving clocking signal in its internal circuit, comprising:

a clock signal generator for generating an original clock signal;

an input/output buffer having an input path and an output path, an output end of the output path being connected to an input end of the input path, the output path receiving the original clock signal and outputting an output original clock signal;

an output enabling/disabling controller for controlling the output of the input/output buffer; and a selector for selecting between the original clock signal and a signal from the input path of the input/output buffer, the selected signal being supplied to the internal circuit as the driving clock signal.

3. An integrated circuit using a driving clock signal in its internal circuit, comprising:

a terminal for receiving an external clock signal;

an input/output buffer having an input path and an output path, an output end of the output path being connected to an input end of the input path, the output path receiving a clock signal resulting from the external clock signal and outputting a clock signal:

an output enabling/disabling controller for controlling the output of the input/output buffer; and a selector for selecting between the clock signal resulting from the external clock signal and a signal from the input path of the input/output buffer as a selected signal, the selected signal being supplied to the internal circuit as the driving clock signal.

4. An integrated circuit according to claim 2 wherein the output enabling/disabling controller prohibits the output of the input/output buffer, while the integrated circuit is in a test mode.

5. An integrated circuit according to claim 3 wherein the output enabling/disabling controller prohibits the output of the input/output buffer, while the integrated circuit is in a test mode.

6. A clock control method for an integrated circuit, which comprises the steps of:

receiving an original clock existing in an integrated circuit and outputting an output original clock via an output buffer of an input/output buffer to outside of said integrated circuit;

returning the output original clock via an input buffer of the input/output buffer; and selectively using the returned clock or the original clock in an internal circuit of the integrated circuit.

* * * * *